(12) United States Patent
Beser

(10) Patent No.: US 6,807,193 B1
(45) Date of Patent: Oct. 19, 2004

(54) CABLE MODEM WITH DRIBBLE GRANT ACCESS SYSTEM AND METHOD

(75) Inventor: Nurettin B. Beser, Arlington Heights, IL (US)

(73) Assignee: 3COM Corporation, Santa Clara, CA (US)

( * ) Notice: Subject to any disclaimer, the term of this patent is extended or adjusted under 35 U.S.C. 154(b) by 754 days.

(21) Appl. No.: 09/597,841

(22) Filed: Jun. 20, 2000

(51) Int. Cl.⁷ .................................................. H04J 3/00
(52) U.S. Cl. ...................... 370/498; 370/280; 370/326; 370/478; 370/346
(58) Field of Search ................................ 370/346, 449, 370/465, 351, 216, 248, 254, 431, 519, 356, 443, 447, 451, 461, 462, 493, 494, 495, 352, 442, 487, 490; 704/246, 231; 725/111

(56) References Cited

U.S. PATENT DOCUMENTS 6,181,716 B1 * 1/2001 Lide ........................... 370/519
6,438,123 B1 * 8/2002 Chapman .................... 370/351
6,577,642 B1 * 6/2003 Fijolek et al. ............... 370/465
6,621,812 B1 * 9/2003 Chapman et al. ........... 370/346

* cited by examiner

Primary Examiner—Wellington Chin
Assistant Examiner—Jamal A. Fox
(74) Attorney, Agent, or Firm—McGlew and Tuttle, PC

(57) ABSTRACT

A modem, communications system and method are provided with a transmitter and a receiver connected to a modem termination system (CMTS) by a medium. The modem has a memory forming a transmit queue including voice and video. The modem has a controller for sending data units from the receive queue to CMTS. The modem requests unsolicited grant service (UGS) from CMTS when the frame controller detects periodic stream to transmit. Upon detecting a data accumulation in the receive queue, the controller asserts a queue indicator. The Modem receives an occasional extra grant per interval and uses these grants until the queue indicator is not asserted. According to another feature, during transmission, the modem requests subsequent grants in a subsequent interval using an extended header having multiple bits for requesting the multiple grants. The CMTS allocates at least an extra grant to form a grant burst in response to the request.

19 Claims, 8 Drawing Sheets

| EH Element Fields | | Usage | Size |
|---|---|---|---|
| EH_TYPE | | Service Flow EH_TYPE = 5 | 4 bits |
| EH_LEN | | Length of EH_VALUE = 2 | 4 bits |
| EH_VALUE | 0 | Indicates no payload header suppression on current packet. | 8 bits [always present] |
| | 1-255 | Payload Header Suppression Index (PHSI) | |
| | | Queue Indicator | 1 bit |
| | | Active Grants | 7 bits |

Figure 4C

CABLE MODEM WITH DRIBBLE GRANT ACCESS SYSTEM AND METHOD

FIELD OF THE INVENTION

The present invention relates to communications and computer local area and wide area networks. More specifically, the invention relates to a modem such as a cable modem as well as a method and system for transmitting computer network data and voice data over a medium, such as a broadband medium, particularly a cable TV network.

BACKGROUND OF THE INVENTION

Many residential communities have been wired with coaxial cable for delivery of TV signals from a cable TV station. Cable television networks provide cable television services to a large number of subscribers over a large geographical area. The cable television networks typically are interconnected by cables such as coaxial cables or a Hybrid Fiber/Coaxial ("HFC") cable system which have data rates of about 10 Mega-bits-per-second ("Mbps") to 30+ Mbps. The Internet, a world-wide-network of interconnected computers, provides multi-media content including audio, video, graphics and text that typically requires a large bandwidth for downloading and viewing. The cable TV station is able to transmit a large number of cable TV channels through the coaxial cable to the homes connected to the coaxial cable. The cable TV cable has a large amount of bandwidth, and very often the cable TV station does not use all of the bandwidth of the cable to transmit the cable TV signals. Cable TV networks therefore often have excess or unused capacity on their cable TV cables. Cable modems, such as those provided by 3Com Corporation of Santa Clara, Calif., and others offer customers higher-speed connectivity to the Internet and other wide area Networks (WANs), an intranet, Local Area Networks (LANs) and other computer networks via the cable television network.

Cable TV companies have taken advantage of the extra capacity of their cable networks and have modified their cable systems to connect individual residential users to the Internet through their cable system. A description of a cable TV system which can also provide Internet, WAN, intranet, LAN and other computer network interconnection via the cable television network is described in the publication Data-Over-Cable-Service-Interface-Specifications (DOCSIS) which is hereby incorporated by reference.

Apart from passing network data there exists an interest in using the Internet and other computer networks to conduct real time voice conversations between two or more separate parties. These voice conversations would be handled much like telephone calls handled by the existing telephone companies. However existing telephone systems and the Internet operate very differently. Traditional telephone systems (voice and video telephony) provide a dedicated connection between two persons during a voice call. When the voice call is initiated, the dedicated connection is created, and after the voice call has been terminated, the connection is also terminated. The Internet on the other hand, divides information into packets or cells. Various computer networks exist capable of transporting variable length (VL) information, such as Internet Protocol (IP) or IEEE 802.3 frames (packets); and fixed length information such as asynchronous transfer mode (ATM) cells. These packets or cells are individually sent out onto the network, mixed with other packets or cells and then individually switched from one path to another by switches in the network until the packet reaches its final destination. A voice call over the Internet, creates a large number of packets which must be delivered very quickly and very accurately. This places a high burden on the computer network.

SUMMARY AND OBJECTS OF THE INVENTION

It is a primary object of the present invention to provide a modem, system and method to carry data units between the modem and a termination system that facilitates real time service flows that generate fixed size data packets on a periodic basis, such as voice over IP, and also allows efficient data traffic including allocation to other users connected to the termination system.

According to the invention, A modem, communications system and method are provided with a transmitter connected to a modem termination system by a medium and with a receiver connected to the modem termination system by the medium. The modem has a memory forming a transmit queue as well as an input/output supplying generated data units, including (at times) voice communications data units. The modem has a data unit controller for sending data units to the input/output from the receive queue and for transmitting data units to the modem termination system such as a cable modem termination system (CMTS). The modem requests unsolicited grant service (UGS) from the CMTS when the modem frame controller detects voice communications data units or another periodic stream, providing fixed data grants of bandwidth time slots, on a real time basis (particularly used for voice communications data units). The controller uses the unsolicited data grants for transmission to the modem termination system. Upon detecting an accumulation of data units in the receive queue, the controller asserts a queue indicator, in a transmission to the modem termination system. The Modem receives in response an occasional extra grant per interval and uses these data grants until the queue indicator is not asserted. According to another feature of the modem, system and method, upon requesting unsolicited grant service (UGS) from the CMTS, the CMTS allocates at least an extra grant to form a talk spurt grant burst in the initial response to the UGS request.

The system and method of the invention are based on the CM and CMTS and a telephone including an audio input, a packet generator and a packet output connected to the input of the CM. Data units supplied by the telephone being are sent to a transmit queue before transmission to the CMTS. Unsolicited grant service (UGS) is established, requested by the CM to the CMTS during a transmission. This provides fixed unsolicited data grants of bandwidth time slots, on a real time basis. Transmissions form the CM to the CMTS use the unsolicited data grants for data units. The CM asserts a queue Indicator, in a transmission to the CMTS upon detecting data units accumulating in the transmission queue. The CMTS allocates an occasional extra grant until the queue indicator is not asserted.

A preferred embodiment of the invention uses the data packet carrying ability of cable TV networks as described in DOCSIS to accurately and quickly transmit a voice call from a cable user to another user over a cable TV cable. However, the invention may also be applied to a wireless system with a packetizing data/audio/video device which sends packets or cells of data to a termination system via radio waves, infrared or other media.

A preferred system is based on a subscriber using a cable modem (CM) connected to a cable modem termination system (CMTS) via a cable. Other media could be used to practice the invention. The system allows for various uses of the entire cable bandwidth. The subscriber can have customer premises equipment (CPE) of various types (a television set may be connected to the cable but this is not required for the invention). The CPE particularly includes a voice signal packet generating device (hereinafter "telephone") connected to the cable modem. This may be a microphone with digital signal processor (DSP) either connected to a personal computer (PC), or as a stand alone unit connected directly to the CM or connected to the CM via a LAN or via a PC. The telephone has a sound input, a CODEC (coder/decoder), to convert the analog signal to digital, and a packetizer to packetize data units based on the audio signal (or other real time signals that generate fixed size data packets on a periodic basis, e.g., a video signal). The terms "packets" and "cells" are used interchangeably in this specification and represent any data unit that is sent between the cable modem and the CMTS. That is, frames sent between the CM and the CMTS may include protocol data units (PDUs) that are packets or cells. The preferred embodiment described herein is based on packets. Other CPE such as a PC or other workstation can also be connected to the cable modem, and can also be connected in series between the cable telephone and the cable modem or to the telephone and the cable modem via a local network, however this is not necessary. The LAN or other network which may be provided, connects the telephone, PC, TV or other customer premises equipment (CPE).

The CM receives digital voice packets from the telephone (voice packet generating device). The CM can also receive non-voice data packets from the LAN, personal computer or other workstation or CPE. The cable TV station has a CMTS which controls the signals being sent between the cable TV station and the individual subscribers.

The system and process of the invention may use many methods of allocating bandwidth, particularly upstream bandwidth, namely data flow to the CMTS. The system provides allocation services including unsolicited grant service (UGS), real-time poling service (rtPS), unsolicited grant service with activity detection (UGS-AD), non-real-time poling service (nrtPS) and best effort (BE) service. An important service flow allocation system used in the preferred embodiment is based on a pole/grant procedure in which the modem requests time slots, when a data packet is to be sent to the CMTS, in an upstream channel from the subscriber to the cable station.

For upstream bandwidth allocation the CMTS must generate a map indicating the use of the channels and the time slots. The media access protocol is based on a MAC-sublayer domain which is a collection of upstream and downstream channels. The system provides service flows and mainly a mechanism for upstream and downstream quality of service management or bandwidth allocation. Service flow ID is used to define a particular unidirectional mapping between a CM and a CMTS. The service flow ID's (SIDs) provide a mechanism for allocation. The upstream transmission time-line is divided into intervals by the upstream bandwidth allocation mechanism. Each interval is an integral number of mini-slots (herein also slots or time slots). A "mini-slot" is the unit used for upstream transmission and there is no requirement that any protocol data unit (PDU) is actually transmitted in a single mini-slot. Frames are units of data exchange between few or more entities at the datalink layer wherein the MAC frame in the system of the invention uses a MAC header which may incorporate a variable length data PDU. The variable-length PDU includes a pair of 48-bit addresses, data and a CRC. Special cases, the MAC header may encapsulate multiple MAC frames into a single MAC frame.

A request frame is a basic mechanism that the CM uses to request bandwidth. A system does not provide for data PDUs following the request frame. The system also provides for a fragmentation whereby MAC PDUs are split into smaller pieces that are transmitted individually and then re-assembled at the CMTS.

When a CM has a data packet to send to the CMTS, the CM requests a time slot from the CMTS in an upstream channel from the subscriber to the cable station. When the CMTS learns of a request, it provides the CM with a time slot. However, when the CM has a voice call, the CM knows that it will have a continuous stream of voice data packets which need to be sent very quickly and very accurately to the CMTS. Therefore instead of the CM separately requesting a time slot for each voice data packet, the CM requests a periodic stream of time slots from the CMTS. The size and frequency of periodic time slots is chosen to fully transmit the voice data packets quickly and accurately.

The invention uses as UGS upstream flow scheduling allowing the mapping of constant bit rate (CBR) traffic onto service flows. Based on the upstream bandwidth being scheduled, the CBR service can be established by the CMTS scheduling a steady stream of grants. This is referred to as unsolicited because the bandwidth is predetermined and there are no ongoing requests being made. By providing scheduling services the efficiency of the pole/grant process can be improved. Upstream flow scheduling services are associated with service flows, each of which is associated with a single SID. When a Service Flow is provisioned for UGS, the Nominal Grant Interval is chosen to equal the packet interval of the CBR application. For example, VoIP applications with 10 ms packet sizes will require a Nominal Grant Interval of 10 ms. The size of the grant, the number of slots, is chosen to satisfy the bandwidth requirements of the CBR application and relates directly to the length of the packet.

When multiple Subflows are assigned to a UGS service, multiple grants per interval are issued. There is no explicit mapping of Subflows to grants. The multiple grants per interval form a pool of grants in which any subflow can use any grant. Various services can be provided tailored to a specific type of dataflow. Specifying a scheduling service and its associated parameters, the CMTS can anticipate a throughput and latency needs of the upstream traffic and provide poles and/or grants at the appropriate times. UGS is used particularly according to the system of the invention whereby real-time service flows that generate fixed size data packets on a periodic basis, such as voice over IP are facilitated. However even with a scheduled service such as UGS, the nature of voice or other similar data packets is such that problems can arise, particularly regarding synchronization. The invention the synchronization problem and allows non-synchronized (mostly external) constant bit rate generated packets to be transported without any incremental delay.

There are two synchronization problems that occur when carrying CBR traffic such as VoIP sessions across a network. The first is a frequency mismatch between the source clock and the destination clock. This is managed by the VoIP application. The second is the frequency mismatch between the CBR source/sinks, and the bearer channel that carries them.

Specifically, if the clock that generates the VoIP packets towards the upstream is not synchronized with the clock at the CMTS which is providing the UGS service, the VoIP packets may begin to accumulate in the CM. This could also occur if a MAP was lost, causing packets to accumulate.

When the CM detects this condition, it asserts the queue Indicator (QI) in the Service Flow EH Element of the frame. Specifically, the Unsolicited Grant Synchronization Header (UGSH) in the Service Flow EH Element is used to pass status information from the CM to the CMTS regarding the state of the UGS Service Flow. The most significant bit of the UGSH is the queue Indicator (QI) bit. The CM MUST set this flag once it detects that this Service Flow has exceeded its transmit queue depth. Once the CM detects that the Service Flow's transmit queue is back within limits, it MUST clear the QI flag. The CMTS will respond by issuing an occasional extra grant. For security reasons the extra grants should be limited relative to the bandwidth. For example, the dribble grants could be limited so as to not exceed 1% of the provisioned bandwidth. (This corresponds to a maximum of one extra grant every one hundred grants). This dribble grant provides a solution to the synchronization problem and enables the use of non synchronized, mostly external, constant bit rate generated packets to be transported without any incremental delay. The CMTS will continue to supply this extra bandwidth until the CM deasserts this bit.

A similar problem occurs in the downstream. The far end transmitting source may not be frequency synchronized to the clock which drives the CMTS. Thus the CMTS should police at a rate slightly higher than the exact provisioned rate to allow for this mismatch and to prevent delay buildup or packet drops at the CMTS.

When there is no activity, the CMTS sends polled requests to the CM. When there is activity, the CMTS sends Unsolicited Grants to the CM. The CM indicates the number of grants per interval which it currently requires in the active grant field of the UGSH in each packet of each Unsolicited Grant. The CM may request up to the maximum active Grants per Interval. The CM constantly sends this state information so that no explicit acknowledgment is required from the CMTS.

It is left to the implementation of the CM to determine activity levels. Implementation options include:

Having the MAC layer service provide an activity timer per Classifier. The MAC layer service would mark a Subflow inactive if packets stopped arriving for a certain time, and mark a Subflow active the moment a new packet arrived. The number of Grants requested would equal the number of active Subflows.

Having a higher layer service entity such as an embedded media client which indicates activity to the MAC layer service.

When the CM is receiving polled requests and it detects activity, the CM requests enough bandwidth for one Grant per Interval. If activity is for more than one Subflow, the CM will indicate this in the active grant field of the UGSH beginning with the first packet it sends.

Instead of the one bit QI field indicating accumulating data, the invention may also use a number field, namely an 8 bit field or clear up indicator. This is used for requesting a burst of grants to clear up accumulating packets. A new extended header is used similar to the described UGHS. With this multiple bits request multiple grants. First, the UGS service is requested upon detecting voice traffic or similar periodic traffic and the CMTS or wireless node termination system initiates UGS providing grants starting with a first grant. The extended header is used to request multiple grants based on asserting a multiple bit flag, whereby the clear up burst is provided.

When the CM is receiving Unsolicited Grants, then detects new activity, and asks for one more grant, there will be a delay in time before it receives the new grant. During that delay, packets may build up at the CM. When the new Unsolicited Grant is added, the CMTS will burst extra Grants to clear out the packet buildup.

When the CM is receiving Unsolicited Grants, then detects inactivity on a Subflow and asks for one less grant, there will be a delay in time before the reduction in Grants occurs. If there has been any build up of packets in the upstream transmit queue, the extra grants will reduce or empty the queue. This is fine, and keeps system latency low. The relationship of which Subflow is getting which specific grant will also change. This effect appears as low frequency jitter that the far end must manage.

When the CM is receiving Unsolicited Grants and detects no activity on any of its Subflows, it will send one packet with the active grants field of the UGSH set to zero grants, and then cease transmission. The CMTS will switch from UGS mode to Real Time Polling mode. When activity is again detected, the CM sends a request in one of these polls to resume delivery of Unsolicited Grants. The CMTS ignores the size of the request and resumes allocating Grant Size grants to the CM.

It is not necessary for the CMTS to separately monitor packet activity since the CM does this already. In the worst case, if the CMTS misses the last packet which indicated zero grants, the CMTS and CM would be back in sync at the beginning of the next talk spurt. Because of this scenario, when the CM goes from inactive to active, the CM must be able to restart transmission with either Polled Requests or Unsolicited Grants.

The present invention preferably modifies the DOCSIS specification, or works within the framework of the DOCSIS specification in order to allocate time slots such that the size and frequency of periodic time slots is sufficient for the most part to handle real time service flows that generate fixed size data packets on a periodic basis. Further system features are provided for additional time slots to overcome synchronization problems as noted.

The system of the invention can optimize the use of the UGS for voice data units. Unsolicited Grant Service with Activity Detection (UGS-AD) is an Upstream Flow Scheduling Service Type. One application of UGS-AD is the support for Voice Activity Detection (VAD). VAD is also known as Silence Suppression and is a voice technique in which the transmitting CODEC sends voice samples only when there is significant voice energy present. The receiving CODEC will compensate for the silence intervals by inserting silence or comfort noise equal to the perceived background noise of the conversation. The advantage of VAD is the reduction of network bandwidth required for a conversation. It is estimated that 60% of a voice conversation is silence. With that silence removed, a network can handle substantially more traffic. Subflows in this context are described as active and inactive.

The system provides for the starting and stopping of the period stream of time slots. In this way, voice transmission from a subscriber to the CMTS can be provided quickly and accurately, while efficiently using the signal capacity of the cable and in existing systems. This is very important when there are many subscribers wishing to send data to the CMTS, especially when that data is voice data. By starting and stopping the periodic stream of time slots, more capacity is made available to other subscribers. More subscribers can then be serviced on a single cable, and/or faster service can be provided to the other subscribers. All of the data from all of the subscribers on a single line is placed into different time slots on the cable for transmission to the CMTS. Upon starting the UGS service, the system may use the extended header mentioned above to request a clear up burst of grants to clear out accumulating data. This results in the CMTS sending a clear up burst of grants. The 8 bit indicator is changed in subsequent transmissions by the CMTS until no further extra grants are needed.

The telephone, or CM, (in the preferred embodiment the CODEC of the telephone) or a combination of the two, is given the ability to detect when voice activity from the subscriber is above and below a predetermined value. When voice activity is below this predetermined value, the cable telephone and/or CM considers there to be no voice activity and that the subscriber is being silent. When the CM detects no voice activity or a silence period from the subscriber, the CM indicates to the CMTS that the periodic stream of time slots (UGS) is no longer needed and the CMTS stops providing the periodic stream of time slots. When voice activity of the subscriber resumes, the CM again request the periodic stream of time slots, and transmits the voice data packets or cells in these time slots.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 4C is a diagram showing extended MAC header format with queue Indicator;

DESCRIPTION OF THE PREFERRED EMBODIMENT

Figure 1:
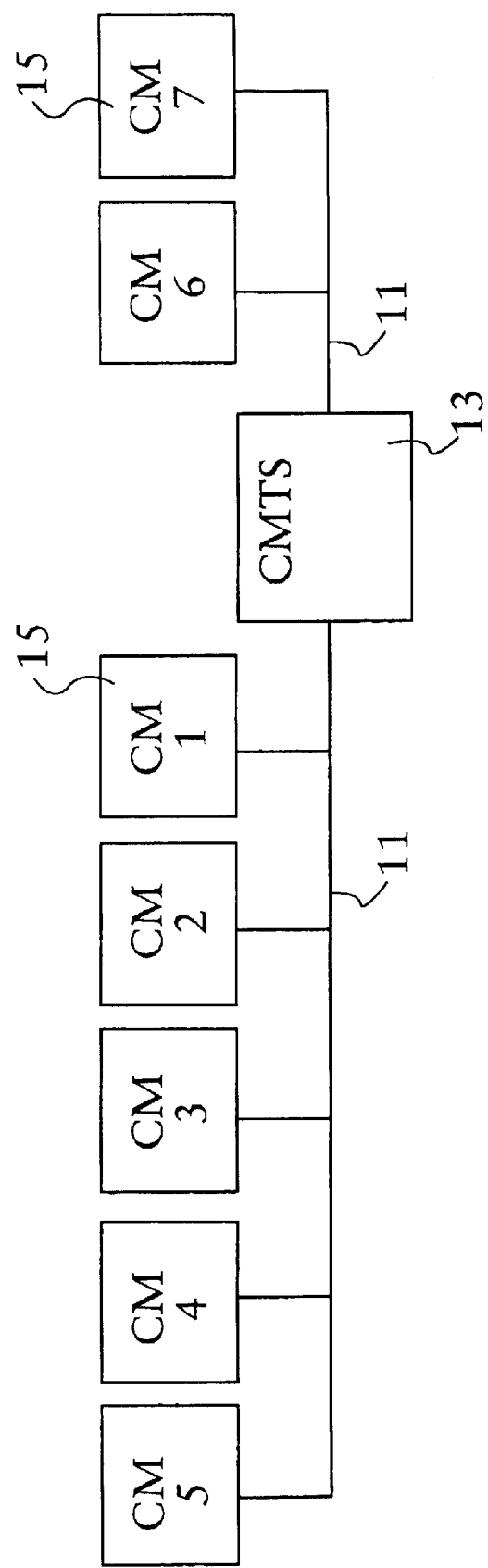
FIG. 1 is a schematic overview of a portion of a cable TV system used according to a preferred embodiment of the invention.

Referring to the drawings in particular, FIG. 1 shows a cable TV system with a plurality of coaxial cable TV cables 11 which connect to a cable modem termination system (CMTS) 13. Connected to each of the cable TV cables 11 are a plurality of cable modems (CM) 15. Each of the cables 11 have a plurality of downstream channels 17 for delivering the cable TV signals and computer network data. The cables 11 also have at least one upstream channel 19 for transferring data from the individual cable modems 15 to the CMTS 13.

Figure 2:
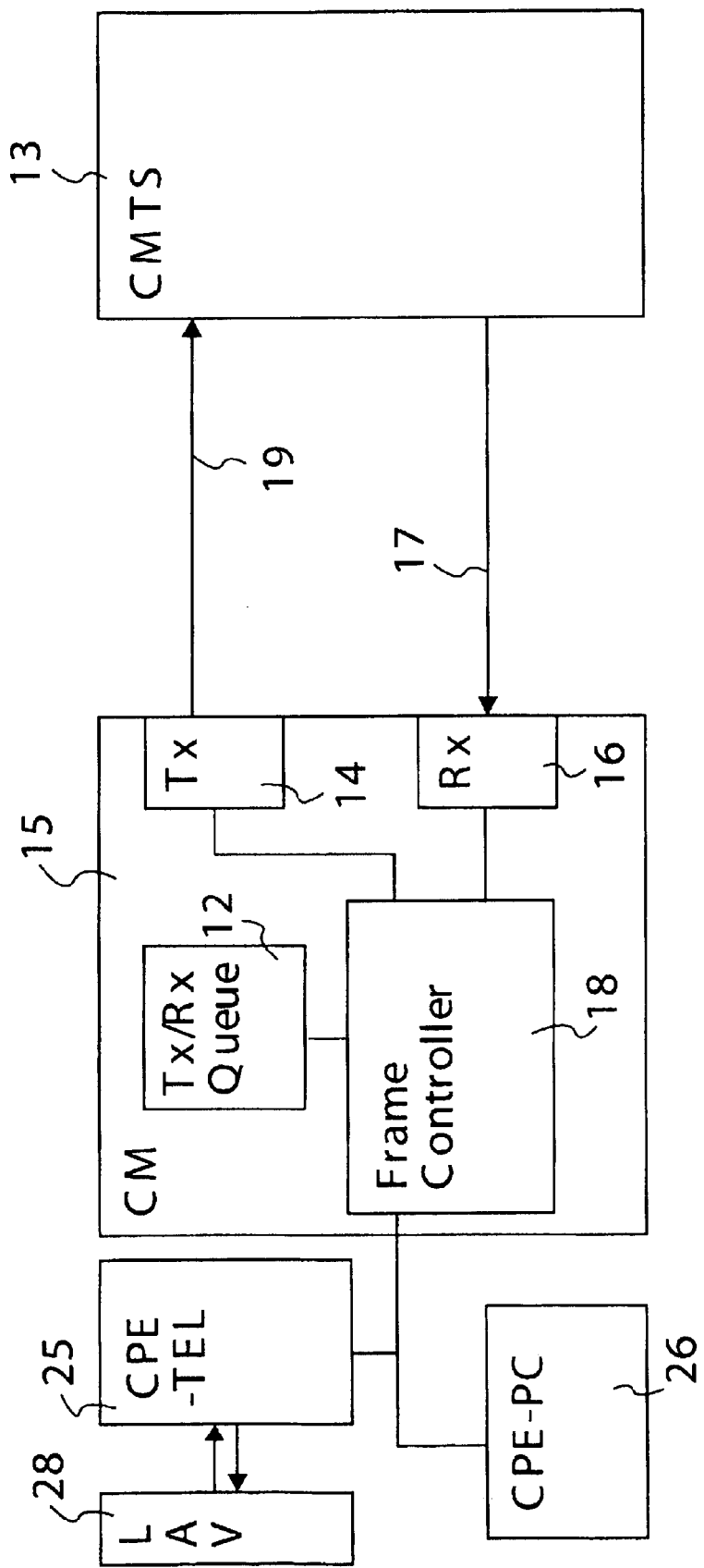
FIG. 2 is a schematic view of the cable modem connected to customer premises equipment at the subscriber side and connected to the cable TV system.

FIG. 2 shows a CM 15 with a memory 12, having a transmit and receive queue, a transmitter 14 a receiver 16 and a frame controller 18. The CM 15 is connected to CPE such as telephone 25 or PC 26. The telephone 25 is a packetizing device which receives local audio or video (LAV) from LAV input device 28. The frame controller 18 receives data units such as computer data units from CPE-PC 26 or data units such as including voice over IP (VoIP) type data units from CPE-Tel 25. The packet controller can also be data unit controller that handles packets or cells as the data units.

The upstream channel 19 and the downstream channels 17 preferably share the same medium, i.e. the same coaxial cable. The preferred embodiment of the present invention is a bus system where all of the CMs 15 have access to the same bus, instead of separate lines or paths for each modem. A plurality of CMs 15 share a common upstream channel 19. The upstream channel 19 is divided into a plurality of data time slots 26 (see FIG. 5). A polling/request system is used. When a CM such as CM 1 (CM1) has a data packet to send to the CMTS 13, the CM 1 requests a time slot from the CMTS 13. The CMTS grants CM 1 a particular time slot 26 in one of the data intervals 23. When the CM 1 receives the grant, CM 1 places the data packet into the time slot 26 as indicated by the CMTS 13.

The upstream scheduling services associated with service flows are each associated with a single SID. Each service flow may have multiple classifiers. Each classifier may be associated with a unique CBR media stream. Classifiers may be added and removed from a service flow. Various services may be provided with each tailored to a specific type of data flow. The basic services include unsolicited grant service (UGS) real-time poling service (rtPS), unsolicited grant service with activity detection (UGS-AD), non-real-time poling service (nrtPS) and best effort service.

Figure 3:
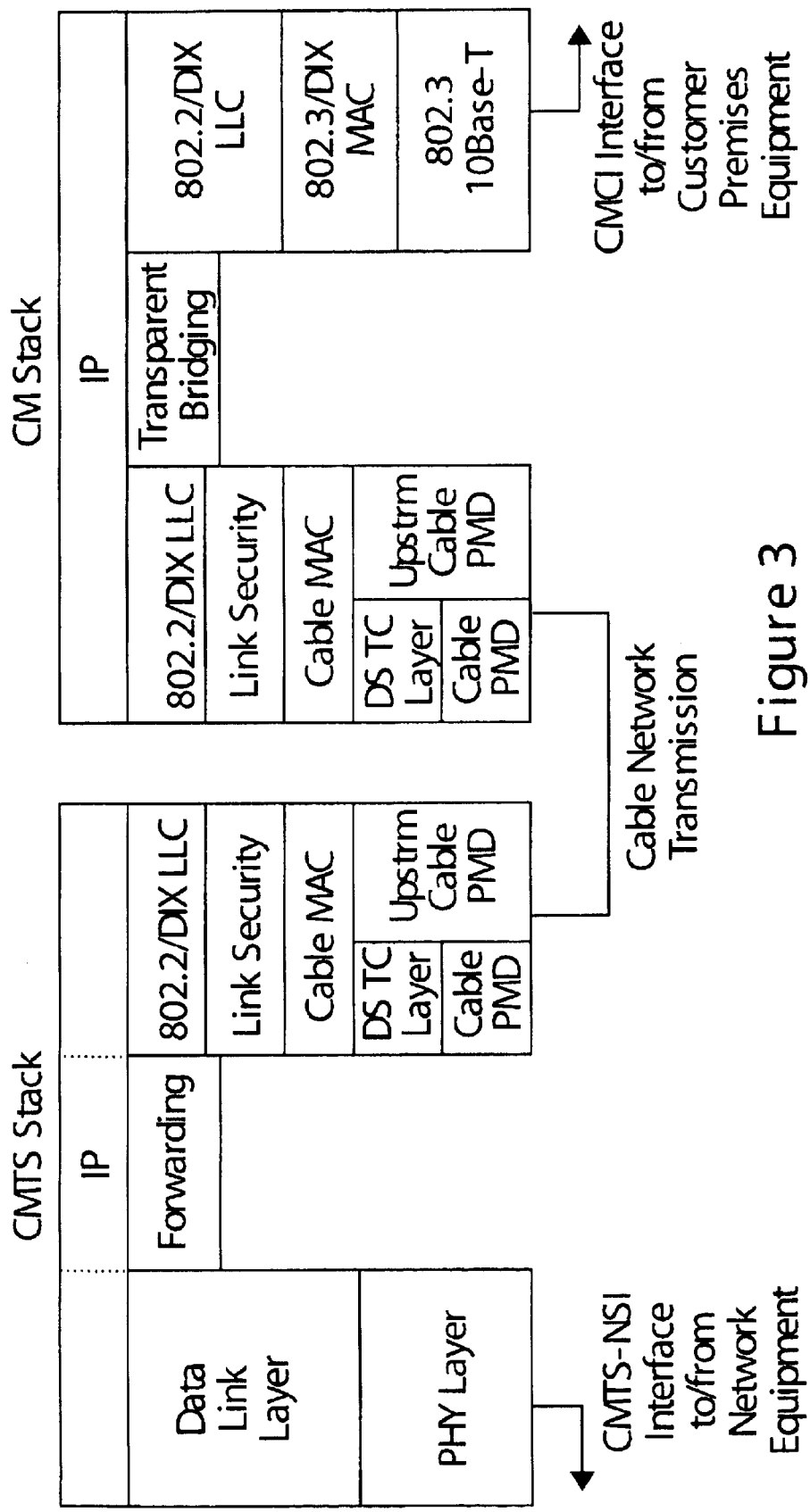
FIG. 3 is a diagram showing data forwarding through the cable modem and cable modem termination system.

FIG. 3 shows data forwarding through the CM and CMTS, namely transparent bridging or network-layer forwarding (routing, IP switching). The network layer protocol is the internet protocol (IP). The IP capability may be used for higher-layer service. The datalink layer is divided into sublayers in accordance with IEEE 802. The subslayers are the logical link control (LLC) sublayer, the link-layer security sublayer, the media access control (MAC) sublayer.

Figure 4A:
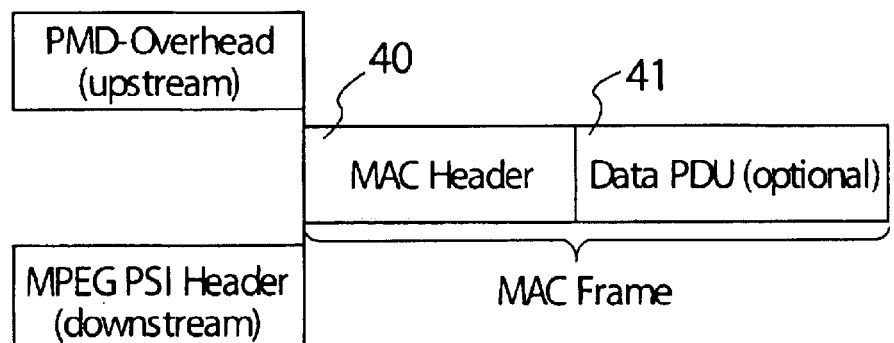
FIG. 4A is a diagram showing a general MAC frame format used in the system of the invention.
Figure 4B:
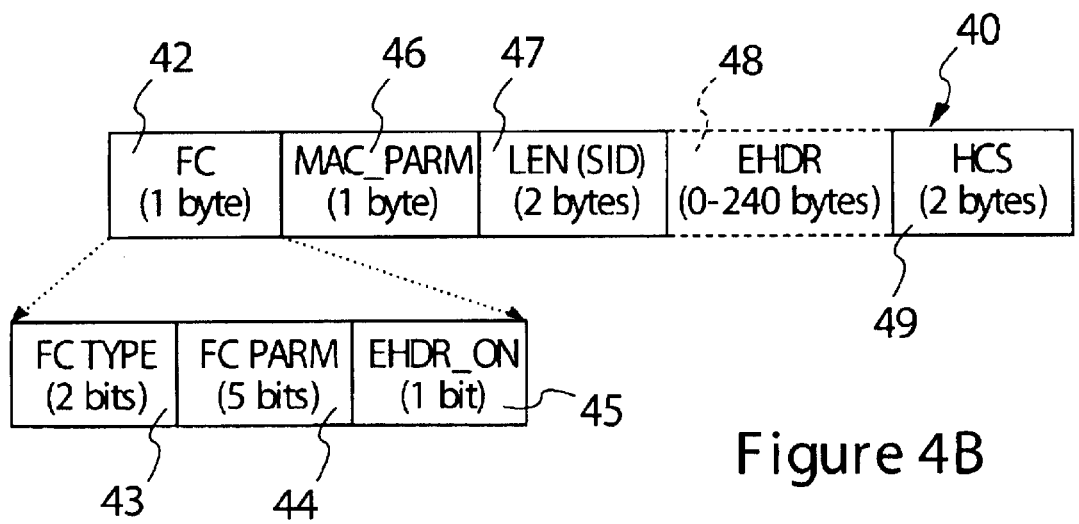
FIG. 4B is a diagram showing a general MAC header format used in the system of the invention.

FIG. 4a shows a general MAC frame format including the physical media dependent (PMD) overhead (in the upstream direction) the MAC header 40 and the data PDU (which is optional) 41. The MAC header 40 shown in FIG. 4b includes the frame control section 42 including the frame control type 43, the frame control parameter 44 and the extended MAC header (EHDR) ON section 45. This last section indicates whether the EHDR is present. Part 46 is the MAC parameter section which is used depending on the frame control section with 47 being used for the length of the MAC frame The EHDR 45 is discussed below. The HCS portion 49 is for MAC header check sequence.

The EHDR is used particularly according to the invention providing an unsolicited grant synchronization header. This is used to pass status information regarding service flow scheduling between the CM 15 and CMTS 13. It is used according to the invention and in the DOCSIS specification in the upstream with UGS and UGS-AG scheduling services, discussed further below.

FIG. 4c shows the UGS EHDR sub-element format wherein the EH_value has one additional byte which includes information related to synchronization. Specifically, the additional bit is the queue Indicator (QI) bit discussed further below.

Figure 5:
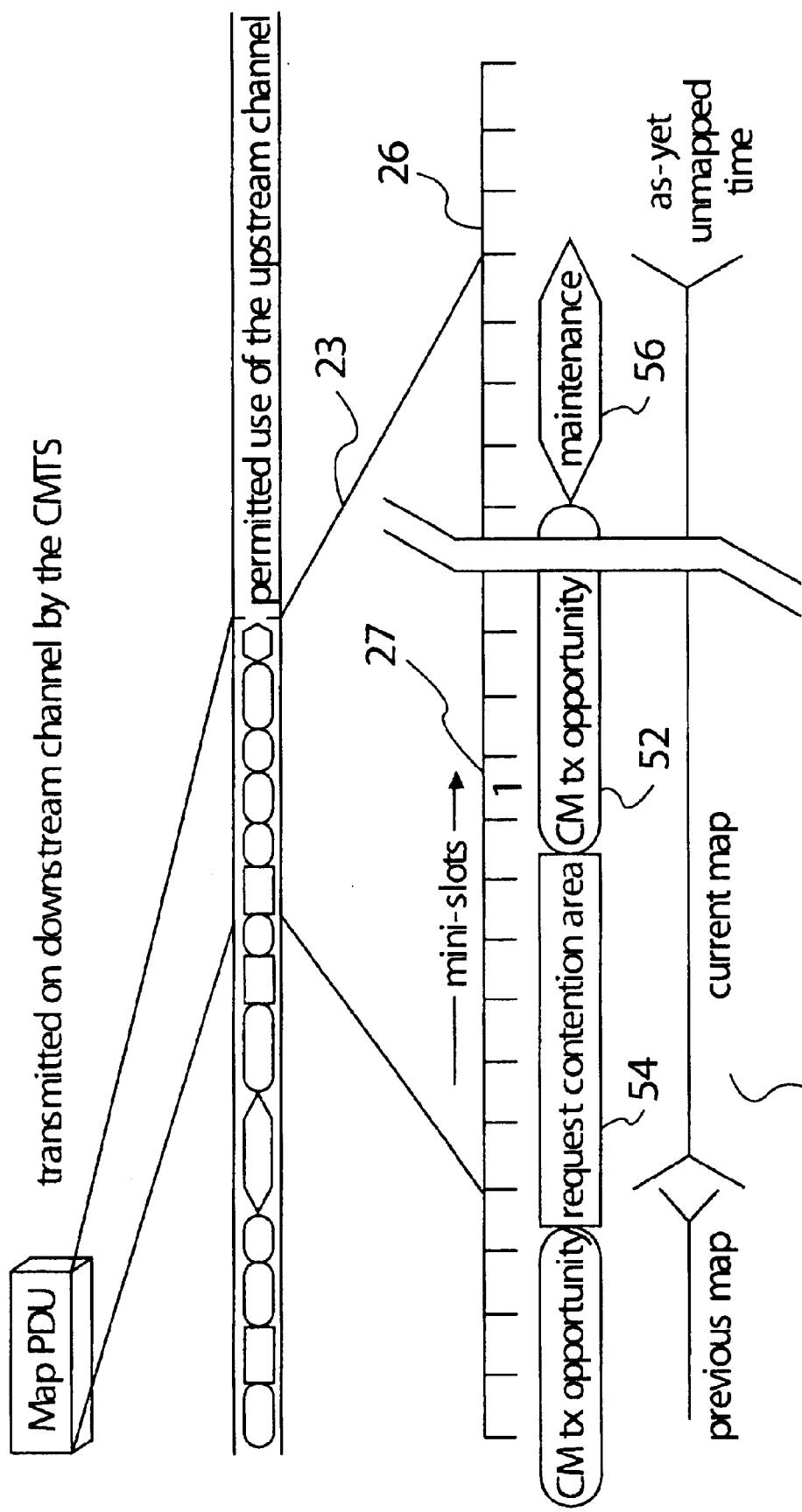
FIG. 5 is a schematic diagram showing the use of time slots by the cable modems.

As shown in FIG. 5, the upstream channel 19 is provided as a stream of slots 26. The CMTS 13 generates a time reference for identifying the slots. The CMTS 13 controls access to the slots by the CMs 15. The CMTS 13 sends an allocation map 50 on the downstream channel 17 which describes, for some interval, the uses to which the upstream slots 26 will be allocated. As can be seen in FIG. 5 the map 50 or upstream allocation can correspond to an interval, namely a CM transmission opportunity 52 as well as a request contention portion 54 and a maintenance portion 56. The slots 23 or minislots are the basic unit for upstream transmission opportunities. There is no implication that any PDU can actually be transmitted in a single minislot. Each interval is labeled with a usage code that defines both the type of traffic that can be transmitted during that interval and the physical-layer modulation encoding. These aspects are discussed more fully described in the DOCSIS specification incorporated herein by reference.

The CM and the system of the invention provide support for real time service flows that generate fixed size data packets on a periodic basis, such as VoIP. When a packet generating telephone 25 sends packets to CM 1, and a voice call or other data stream is initiated, CM 1 will determine that it will receive a constant stream of data packets representing the voice audio of the voice call. The CM then requests Unsolicited Grant Service (UGS) from the CMTS 13. When the CMTS 13 receives a UGS request, the CMTS 13 grants a periodic stream of time slots 26 to the CM 1, for the CM to insert the data packets into those time slots 26 of the periodic stream. This reduces the need for CM 1 to separately request a time slot 26 for each data packet of the voice call and thus reduces the coordination needed and increases the speed at which data packets can be transmitted to the CMTS 13.

FIG. 5 shows upstream intervals and time slots 26. When the CM 1 has requested UGS via the UGSH and the CMTS 13 has responded by indicating that CM 1 is allowed to use one or more slot 26 in each interval 23. FIG. 5 shows that CM number 1 is using the second to last time slot 27 of each interval 23 in the upstream channel 19. While CM 1 is sending voice data packets to the CMTS 3, the remaining cable modules sharing the upstream channel 19 can still request time slots for their own data packets. FIG. 5 does not show how the other time slots 26 in the interval 23 are being used by other CM numbers 2–7.

The Unsolicited Grant Service (UGS) is designed to support real-time service flows that generate fixed size data packets on a periodic basis, such as VoIP. The service offers fixed size grants on a real-time periodic basis, which eliminate the overhead and latency of CM requests and assure that grants will be available to meet the flow's real-time needs. The CMTS MUST provide fixed size data grants at periodic intervals to the Service Flow. The CM with the UGS only uses unsolicited data grants for upstream transmission. The key service parameters are the Unsolicited Grant Size, the Nominal Grant interval, the Tolerated Grant Jitter and the Request/Transmission Policy. The requesting of UGS by a CM 15, and a corresponding granting of UGS is fully described in the DOCSIS specification.

There are two synchronization problems that occur when carrying CBR traffic such as VoIP sessions across a network. The first is a frequency mismatch between the source clock and the destination clock. This is managed by the VoIP application, and is beyond the scope of this specification. The second is the frequency mismatch between the CBR source/sinks, and the bearer channel that carries them.

Specifically, if the clock that generates the VoIP packets towards the upstream is not synchronized with the clock at the CMTS which is providing the UGS service, the VoIP packets may begin to accumulate in the CM. This could also occur if a MAP was lost, causing packets to accumulate.

The Unsolicited Grant Synchronization Header (UGSH) in the Service Flow EH Element (see FIG. 4C) is used to pass status information from the CM to the CMTS regarding the state of the UGS Service Flow. The most significant bit of the UGSH is the QI bit. The CM MUST set this flag once it detects that this Service Flow has exceeded its transmit queue depth. Once the CM detects that the Service Flow's transmit queue 12 is back within limits, it must clear the QI flag. The flag allows the CMTS to provide for long term compensation, for conditions such as lost maps or clock rate mismatch's, by issuing additional grants.

The CMTS must not allocate more grants per Nominal Grant Interval than the Grants Per Interval parameter of the Active QoS Parameter Set, excluding the case when the QI bit of the UGSH is set or where the 8 bit clear up indicator is set in the alternative extended header. In these cases, the CMTS should grant a dribble grant or clear up grant burst. The dribble grants are limited for security reasons to e.g., up to 1% additional bandwidth for clock rate mismatch compensation. If the CMTS grants additional bandwidth, it MUST limit the total number of bytes forwarded on the flow during any time interval to Max(T), as described in the expression $$Max(T)=T*(R*1.01)+B$$

Where Max(T) is the maximum number of bytes transmitted on the flow over a time T (in units of seconds), R=(grant size*grants-per-interval)/nominal-grant-interval, and B=grant size*grants_per_interval.

When the CM detects the condition of the packet generator at the CM side and the CMTS there will be a build up of packets in the CM (at the transmit queue 12) as the UGS will not have capacity to take the buildup. The CM detects that this Service Flow has exceeded its transmit queue depth. The CM then asserts the queue indicator in the Service Flow EH Element. The CMTS will respond by issuing an occasional extra grant corresponding so as to not exceed a limit e.g., 1% of the provisioned bandwidth. (This corresponds to a maximum of one extra grant every one hundred grants). The CMTS will continue to supply this extra bandwidth until the CM deasserts this bit.

Figure 6:
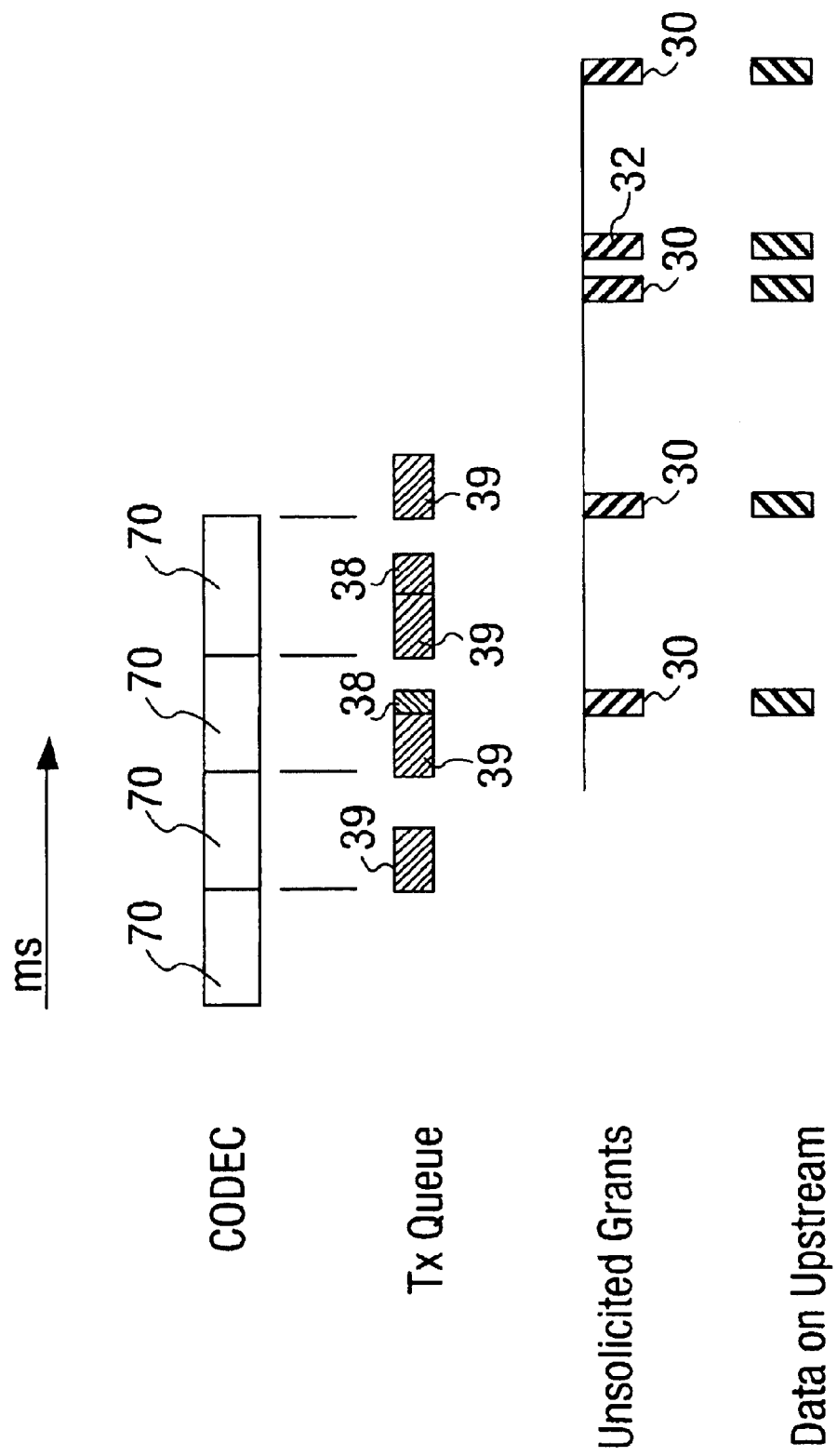
FIG. 6 is a time line showing the relative timing of the different activities during a voice call over a cable TV system providing dribble grants.

The ordinary UGS grants 30 and the additional dribble grant 32 are shown in FIG. 6 which also shows the transmit queue 12 status (Tx queue). FIG. 6 shows the CODEC either associated with the CM 15 or connected to the CM 15 (present in the telephone 25) generates voice data packets 70 on a periodic basis corresponding to voice signals received from the LAV unit 28. The DSP CODEC generates the packets and transfers these to the upstream transmit queue 12 (indicated in FIG. 7 as data unit blocks). Because of a synchronization problem the transmit queue 12 begins to fill up with packets or packet fragments 38. These accumulate and are in addition to the packets 39 which are the basis for the UGS request. The CMTS 13 issues the ordinary grants 30. When the CM 15 detects the additional packets 38 accumulating in the transmit queue, the CM 15 asserts the QI flag in the MAC header portion 48. The CMTS 13 responds by issuing the occasional extra grant or dribble grant 32. Thus can be seen in FIG. 6 the data on the upstream is sent with additional data being sent corresponding to the occasionally issued additional grant 32. When the status of the transmit queue returns to normal, the QI flag is deasserted.

When the CM 15 is receiving polled requests and it detects activity, the CM 15 requests enough bandwidth for one Grant per Interval. If activity is for more than one Subflow, the CM will indicate this in the active grant field of the UGSH beginning with the first packet it sends. Upon starting the UGS service, the system may use the extended header mentioned above to request a clear up burst of grants to clear out accumulating data. This results in the CMTS sending a clear up burst of grants. The 8 bit indicator is changed in subsequent transmissions by the CMTS until no further extra grants are needed.

The CMTS may provide an extra bursts of Unsolicited Grants in the form of a Talk Spurt Grant Burst (TSGB) in the initial response to the request. As any delay between arrival of the these initial packets will add to the final latency of the phone call, the TSGB can be used to empty the transmit buffer 12 and lower the latency of the call.

When the CM is receiving Unsolicited Grants, then detects new activity, and asks for one more grant, there will be a delay in time before it receives the new grant. During that delay, packets may build up at the CM. When the new Unsolicited Grant is added, the CM can use the alternate extended header with multiple bits requesting multiple grants. The CMTS will burst extra Grants 34 to clear out the packet buildup.

When the CM is receiving Unsolicited Grants, then detects inactivity on a Subflow and asks for one less grant, there will be a delay in time before the reduction in Grants occurs. If there has been any build up of packets in the upstream transmit queue, the extra grants will reduce or empty the queue 12. This is fine, and keeps system latency low. The relationship of which Subflow is getting which specific grant will also change. This effect appears as low frequency jitter that the far end must manage.

When the CM is receiving Unsolicited Grants and detects no activity on any of its Subflows, it will send one packet with the active grants field of the UGSH set to zero grants, and then cease transmission. 2 The CMTS will switch from UGS mode to Real Time Polling mode. When activity is again detected, the CM sends a request in one of these polls to resume delivery of Unsolicited Grants. The CMTS ignores the size of the request and resumes allocating Grant Size grants to the CM.

It is not necessary for the CMTS to separately monitor packet activity since the CM does this already. In the worst case, if the CMTS misses the last packet which indicated zero grants, the CMTS and CM would be back in sync at the beginning of the next talk spurt. Because of this scenario, when the CM goes from inactive to active, the CM must be able to restart transmission with either Polled Requests or Unsolicited Grants.

Figure 7:
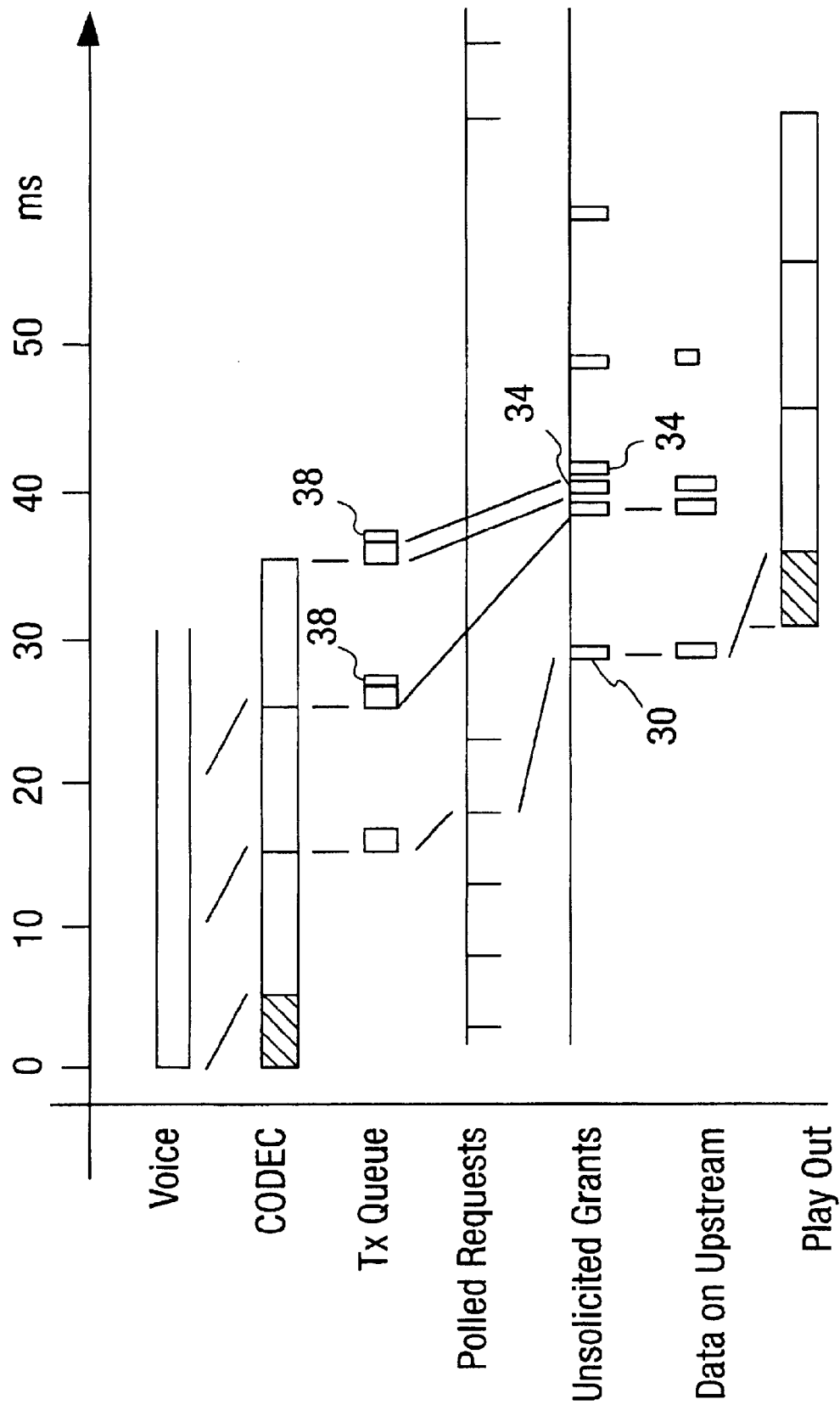
FIG. 7 is a time line showing the relative timing of the different activities during a voice call over a cable TV system showing a clear up grant burst.

FIG. 7 shows the situation where the a single G.711 (64 kbps) voice call with a packet size of 10 ms, and a receive jitter buffer that requires a minimum of 20 ms of voice (thus 2 packets) before it will begin playout.

Assume voice begins at time zero. After a nominal processing delay and a 10 ms packetization delay, the CODEC generates voice packets which are then transferred to the upstream transmit queue 12. The next Polled Request is used which results in the start of the Unsolicited Grants 30 some time later. As packets start to accumulate, with an alternative aspect of the system of the invention, upon starting the UGS service, the system may use the extended header mentioned above to request a clear up burst of grants to clear out accumulating data. This results in the CMTS sending a clear up burst of grants. The 8 bit indicator is changed in subsequent transmissions by the CMTS until no further extra grants are needed. With this aspect of the system, a multiple bit request provides a multiple grant clear up burst.

These packets traverse the network and arrive at the receive jitter buffer. The 20 ms. minimum jitter buffer is met when the second packet arrives. Because the packets arrived close together, only an additional few milliseconds of latency has been added. After a nominal processing delay, playout begins.

When the voice spurt ends, the CM sends one remaining packet with no payload and with the active grants field of the UGSH set to zero grants. Some time later, UGS stops, and Real Time Polling begins.

UGS/AD is used with Voice Activity Detection (VAD) or silence suppression, namely the voice technique in which the transmitting CODEC (coder/decoder) sends voice samples only when there is significant voice energy present. The receiving CODEC will compensate for the silence intervals by inserting silence or comfort noise equal to the perceived background noise of the conversation.

The advantage of VAD is the reduction of network bandwidth required for a conversation. It is estimated that 60% of a voice conversation is silence. With that silence removed, that would allow a network to handle substantially more traffic.

Subflows in this context will be described as active and inactive. Both of these states are within the MAC Layer QOS state known as Active. The configuration parameters include all of the normal UGS parameters, plus Nominal Polling Interval and Tolerated Poll Jitter. Explanation of these parameters and their default values are provided in Appendix C of the DOCSIS.

When there is no activity, the CMTS sends polled requests to the CM. When there is activity, the CMTS sends Unsolicited Grants to the CM. The CM indicates the number of grants per interval which it currently requires in the active grant field of the UGSH in each packet of each Unsolicited Grant. The CM may request up to the maximum active Grants per Interval. The CM constantly sends this state information so that no explicit acknowledgment is required from the CMTS. It is left to the implementation of the CM to determine activity levels. Implementation options include:

Having the MAC layer service provide an activity timer per Classifier. The MAC layer service would mark a Subflow inactive if packets stopped arriving for a certain time, and mark a Subflow active the moment a new packet arrived. The number of Grants requested would equal the number of active Subflows.

Having a higher layer service entity such as an embedded media client which indicates activity to the MAC layer service.

While specific embodiments of the invention have been shown and described in detail to illustrate the application of the principles of the invention, it will be understood that the invention may be embodied otherwise without departing from such principles.

What is claimed is:

1. A cable modem comprising:

a transmitter connected to a modem termination system by a medium;

a receiver connected to the modem termination system by the cable;

a memory forming a transmit queue;

an input/output supplying generated data units, said data units from time to time including voice communications data units;

a data unit controller for sending data units to the input/output from the receive queue and transmitting data units to the modem termination system via the transmit queue and receiving unsolicited grant service (UGS) from the modem termination system, providing fixed grants of bandwidth time slots, on a real time basis, the controller using unsolicited data grants for transmission to the modem termination system and for asserting a queue indicator, in a transmission to the modem termination system upon detecting data units accumulating in the transmission queue and receiving in response an occasional extra grant and using occasional extra grant to send the accumulated data units until the queue indicator is not asserted.

2. A cable modem according to claim 1, wherein the data unit controller receives polled requests from the modem termination system when UGS is not active and upon the data unit controller detecting activity, the cable modem requests UGS in the form of enough bandwidth for one grant per transmission interval and requests subsequent grants in a subsequent interval using an extended header having multiple bits for the multiple grants.

3. A cable modem according to claim 1, wherein when new UGS is requested, the modem termination system bursts extra grants to clear out any packet buildup in the memory.

4. A cable modem according to claim 2, wherein when the cable modem is receiving UGS and then detects inactivity on a transmission subflow and asks for one less grant, there will be a delay in time before the reduction in grants occurs during which the data unit controller empties the transmit queue.

5. A cable modem according to claim 1, wherein when the cable modem is receiving UGS and detects no activity on any of its transmission subflows, it will send one packet with an active grants field of the header associated with the transmission set to zero grants, and then cease transmission causing the modem termination system to switch from UGS mode to real time polling.

6. A cable modem according to claim 1, wherein the cable modem generates packets or receives packets from the input/output based on voice signals formed with voice activity detection (VAD) or silence suppression, namely a voice technique in which the transmitting including voice samples occurs only when there is significant voice energy present wherein a receiving unit will compensate for the silence intervals by inserting silence or comfort noise equal to the perceived background noise of the conversation.

7. A method for transmitting data units from a modem to a terminating system, the method comprising the steps of:

providing a modem with a transmitter connected to a cable modem termination system (CMTS) by a cable and with a receiver connected to the CMTS by the cable;

providing a memory forming a transmit queue;

providing an input supplying generated data units, including from time to time voice communications data units;

receiving unsolicited grant service (UGS) from the CMTS, providing fixed unsolicited data grants of bandwidth time slots to the modem, on a real time basis;

using the unsolicited data grants for transmission to the CMTS and for asserting a queue indicator, in a transmission to the CMTS upon detecting a data units accumulating in the transmit queue; and receiving in response an occasional extra grant per transmission interval until the queue indicator is not asserted.

8. A method according to claim 7, wherein the data unit controller receives polled requests from the CMTS when UGS is not active and upon the modem detecting activity including voice communications data units, the cable modem requests UGS in the form of enough bandwidth for one grant per transmission interval and requests subsequent grants in a subsequent interval using an extended header having multiple bits for requesting the multiple grants.

9. A method according to claim 7, wherein when new UGS is added, the CMTS bursts extra grants to clear out any packet buildup in the memory.

10. A method according to claim 7, wherein when the cable modem is receiving UGS and then detects inactivity on a transmission subflow and asks for one less grant, there will be a delay in time before the reduction in grants occurs and the data unit controller empties the transmit queue.

11. A method according to claim 7, wherein when the cable modem is receiving UGS and detects no activity on any of its transmission subflows, it will send one packet with an active grants field of the header associated with the transmission set to zero grants, and then cease transmission causing the CMTS to switch from UGS mode to Real Time Polling mode.

12. A method according to claim 7, wherein the cable modem generates packets or receives packets from the input/output based on voice signals formed with a voice technique in which data is transmitted including voice samples only when there is significant voice energy present wherein a receiving unit will compensate for the silence intervals by inserting silence or comfort noise equal to the perceived background noise of the conversation.

13. A data unit transmission system, comprising:

a cable modem termination system (CMTS);

a cable modem (CM) with a transceiver connected to the CMTS by a cable, the CM having at least one memory forming a transmit queue and an input supplying generated data units, including from time to time voice communications data units;

a telephone including an audio input, a packet generator and a packet output connected to the input of the CM, with data units supplied by the telephone being stored in the transmit queue before transmission to the CMTS;

unsolicited grant service (UGS) from the CMTS to the CM, providing fixed unsolicited data grants of bandwidth time slots, on a real time basis;

transmissions form the CM to the CMTS using the unsolicited data grants for voice communications data units and for asserting a queue indicator, in a transmission to the CMTS, upon detecting data units accumulating in the transmission queue; and allocation of an extra grant during one or successive grant intervals until the queue indicator is not asserted.

14. A system according to claim 13, wherein the data unit controller receives polled requests from the CMTS when UGS is not active and upon the modem detecting activity including voice communications data units, the cable modem requests UGS in the form of enough bandwidth for one grant per transmission interval and in an extended header, using the unsolicited grants, the CM and requests a grant burst in of subsequent grants in a subsequent interval using an extended header having multiple bits for requesting the multiple grants the grant burst being requested based on the status of the transmission queue.

15. A system according to claim 13, wherein when new UGS is added, the CMTS bursts extra grants to clear out any packet buildup in the memory.

16. A system according to claim 13, wherein when the cable modem is receiving UGS and then detects inactivity on a transmission subflow and asks for one less grant, there will be a delay in time before the reduction in grants occurs and the data unit controller empties the transmit queue.

17. A system according to claim 13, wherein when the cable modem is receiving UGS and detects no activity on any of its transmission subflows, it will send one packet with an active grants field of the header associated with the transmission set to zero grants, and then cease transmission causing the CMTS to switch from UGS mode to Real Time Polling mode.

18. A system according to claim 13, wherein the cable modem generates packets or receives packets from the input/output based on voice signals formed with a voice technique in which the transmitting including voice samples only when there is significant voice energy present wherein a receiving unit will compensate for the silence intervals by inserting silence or comfort noise equal to the perceived background noise of the conversation.

19. A data unit transmission system, comprising:

a termination system and a unit with a transmitter connected to the termination system by a medium, the unit having a transmit queue;

a packet generator connected to the unit, supplying generated data units to the transmit queue for transmission to the termination system, the data at times including voice communications packets or other packets based on real time service flows that generate fixed size data packets on a periodic basis;

requesting unsolicited grant service (UGS) by the unit from the termination system upon detecting packets based on the real time service flows that generate fixed size data packets on a periodic basis;

providing UGS from the termination system to the unit, to providing fixed unsolicited data grants of bandwidth time slots, on a real time basis;

transmitting from the unit to the termination system using the unsolicited data grants for sending data units from the unit to the termination system;

during the step of transmitting, requesting subsequent grants in a subsequent interval using an extended header having multiple bits for requesting the multiple grants; and allocating at least an extra grant to form a grant burst in response to the multiple bits for requesting the multiple grants.

* * * * *